United States Patent [19]

Ohlrogge et al.

[11] Patent Number: 5,537,911
[45] Date of Patent: Jul. 23, 1996

[54] METHOD AND DEVICE FOR SEPARATING GAS MIXTURES FORMED ABOVE LIQUIDS

[75] Inventors: Klaus Ohlrogge, Geesthacht; Jan Wind, Barsbüttel; Michael Burmeister, Lauenburg, all of Germany

[73] Assignees: GKSS-Forschungszentrum Geesthacht GmbH, Geesthacht; SIHI Anlagentechnik GmbH, Itzehoe, both of Germany

[21] Appl. No.: 331,497

[22] PCT Filed: Apr. 27, 1993

[86] PCT No.: PCT/DE93/00367

§ 371 Date: Dec. 20, 1994

§ 102(e) Date: Dec. 20, 1994

[87] PCT Pub. No.: WO93/22031

PCT Pub. Date: Nov. 11, 1993

[30] Foreign Application Priority Data

Apr. 27, 1992 [DE] Germany .......................... 42 14 551.1

[51] Int. Cl.⁶ .................................................. B01D 53/22
[52] U.S. Cl. .............................. 95/22; 95/45; 95/50; 96/4
[58] Field of Search .............................. 95/19, 22, 45, 95/46, 50; 96/4–14

[56] References Cited

U.S. PATENT DOCUMENTS

| 2,388,095 | 10/1945 | Stahly | 95/50 |
|---|---|---|---|
| 3,241,293 | 3/1966 | Pfefferle | 96/4 X |
| 4,370,150 | 1/1983 | Fenstermaker | 95/50 X |
| 4,772,295 | 9/1988 | Kato et al. | 95/50 |
| 4,857,082 | 8/1989 | DiMartino, Sr. et al. | 95/19 |
| 4,994,094 | 2/1991 | Behling et al. | 95/50 X |
| 5,053,058 | 10/1991 | Mitariten | 96/4 X |
| 5,220,799 | 6/1993 | Lievens et al. | 95/19 X |
| 5,281,253 | 1/1994 | Thompson | 95/45 X |
| 5,354,547 | 10/1994 | Rao et al. | 95/50 X |

FOREIGN PATENT DOCUMENTS

| 0247585 | 12/1987 | European Pat. Off. | 95/50 |
|---|---|---|---|
| 3-056114 | 3/1991 | Japan | 95/50 |
| 4-219113 | 8/1992 | Japan | 95/50 |
| 6-114229 | 4/1994 | Japan | 95/50 |

*Primary Examiner*—Robert Spitzer
*Attorney, Agent, or Firm*—Robert W. Becker & Associates

[57] ABSTRACT

In a method for separating a gas mixture above a liquid a separating device with a gas separation membrane having retentate side and a permeate side is employed. A vacuum at the retentate side of the gas separation membrane and a vacuum at the permeate side of the gas separation membrane are provided. The gas mixture, resulting from transferring a liquid from one storage container to another container upon contact with the surroundings, is fed to the retentate side of the gas separation membrane by the vacuum present at the retentate side and the permeate side. The flow volume per time unit of the gas mixture fed to the separating device is greater than a flow volume per time unit of the liquid being transferred. On the retentate side of the gas separation membrane a gas-diminished retentate is generated and on the permeate side of the gas separation membrane a gas-enriched permeate is produced. The flow volume per time unit of the permeate is equal to the flow volume per time unit of the liquid being transferred.

11 Claims, 1 Drawing Sheet

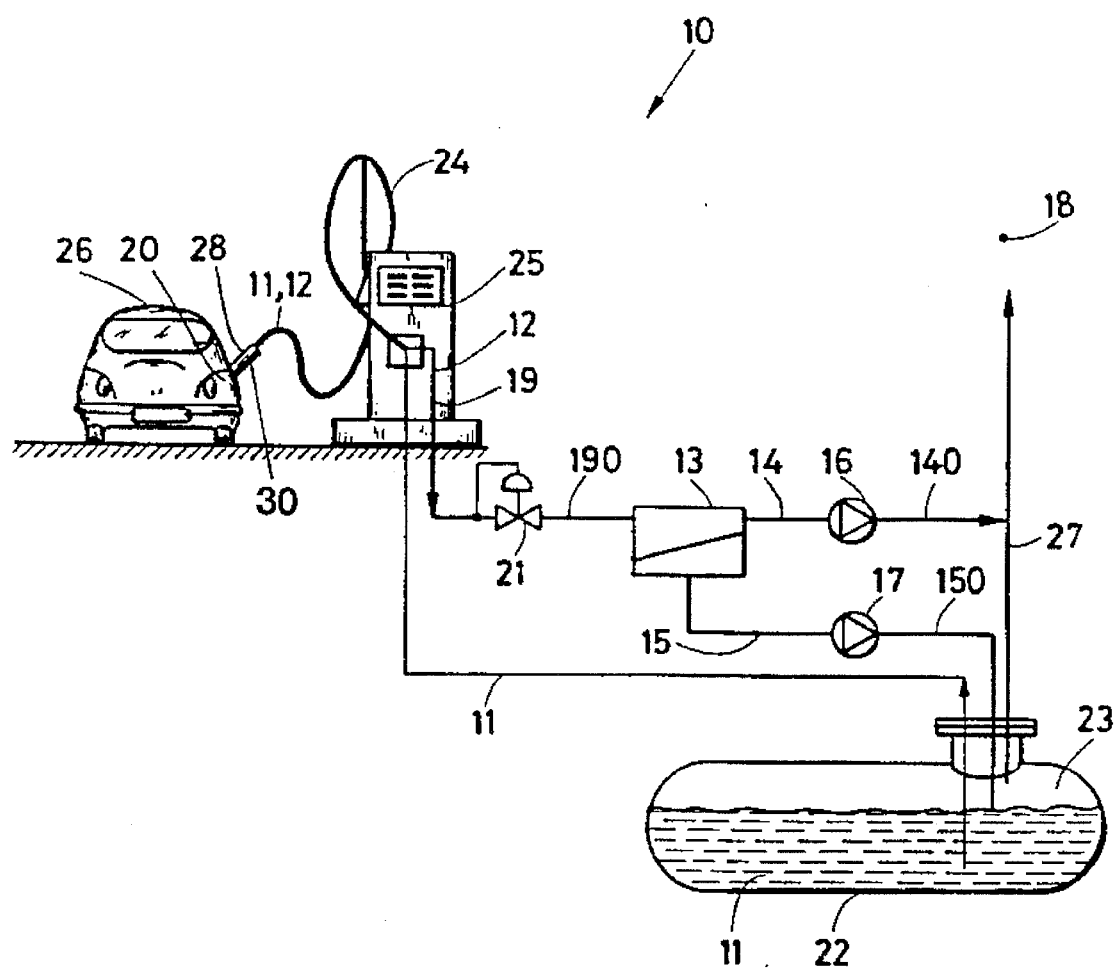

METHOD AND DEVICE FOR SEPARATING GAS MIXTURES FORMED ABOVE LIQUIDS

BACKGROUND OF THE INVENTION

The invention relates to a method for separating gas mixtures formed above liquids, especially hydrocarbon gas mixtures, by using a separating device comprising a gas separation membrane, on the retentate side of which a mixture (retentate) diminished in one or more components and on the permeate side of which a mixture (permeate) enriched by one or more components can be generated, as well as to a device for performing this method.

It is known that, for example, upon filling of containers with liquids, gases, respectively, gas mixtures comprised of the components of the liquid are formed directly at the filling location. In the past, this gas, respectively, gas mixture, resulting from processes governed by natural laws, has been released in most situations into the surroundings in an uncontrolled manner, for example, during filling of gas tanks of motorized vehicles at gas stations directly into the air. The uncontrolled release of gas, respectively, gas mixtures during such transfer, respectively, refilling operations has two considerable disadvantages. On the one hand, a considerable amount of the liquid is released in a gaseous form into the surroundings, which results in a considerable economical disadvantage, and, on the other hand, the environment as well as the person performing the transfer, respectively, filling operation is exposed to considerable amounts of noxious gases.

For eliminating these considerable disadvantages it has been suggested among other things due to regulatory mandates, for example, for the filling of tanks of motorized vehicles, to provide the so-called pump nozzle, from which the fuel exits in order to be filled into the motorized vehicle, with a sealing sleeve that encloses the tank socket and parts of the nozzle whereby the transition of the tank socket to the nozzle is sealed relative to the surroundings. Via this sealing sleeve the gases formed during the filling operation are enclosed relative to the surroundings and returned into the tank. In this manner it is to be ensured that during filling of the tank of a motorized vehicle, which is applicable in the same manner in general to other containers to be filled, the gases respectively, gas mixtures formed during transfer, respectively, filling cannot exit from the tank but instead are recycled within a closed system. In this context, a filter which is, in general, provided within a tank vent of any liquid containing tank and is, for example, in the form of an active carbon filter designed to reduce the venting loss of such tanks, serves to absorb the gases that are formed within the tank, respectively, container of a motorized vehicle. The goal is to return the displaced gas volume from an operating liquid tank into a storage tank from which the liquid has been transferred into the operating liquid tank. This is also referred to by the term "gas shuttling". Gas shuttling is demanded by law in different countries and comprises the installation of a small active carbon container within motorized vehicles for reducing the venting losses as well as for gas shuttling at gas stations.

It is an object of the present invention to provide a method and a device of the aforementioned kind with which the last mentioned systems can be improved such that an even more effective return of gases, respectively, gas mixtures into the liquid container is possible whereby the method shall be performed with simple means and the device for performing the method should be cost-effective and essentially maintenance-free so that the method and/or the device can be used in large numbers, for example, at any suitable fuel pump or as a central unit of a gas station for motorized vehicles etc., so that thereby the environmental impact and the health risk to the person performing the refilling operation can be reduced to limits that are safe with respect to the environment and health.

SUMMARY OF THE INVENTION

This object is solved according to the inventive method by providing that the flow volume per time unit of the gas mixture to be separated and fed to the separating device by vacuum produced at the retentate and permeate side, which gas mixture is formed during the transfer operation of the liquid upon contact with the surrounding gas, is greater than the flow volume per time unit of the liquid transferred during the transfer process and the flow volume per time unit of the generated permeate is equal or smaller than the flow volume per time unit of the liquid during transfer.

In this manner it is advantageously ensured that the stable layer of a mixture of gas and air formed above the liquid level of a container or tank, in which, for example, fuels such as gasoline etc. are stored, is maintained in a predetermined relation not to be disturbed so that this relation is inventively not disturbed and the thus operated gas return systems with vacuum assistance are not subjected to any reduction of their effectiveness.

Accordingly, the inventive method for separating a gas mixture above a liquid is primarily characterized by the steps of:

- employing a separating device with a gas separation membrane having a retentate side and a permeate side;
- producing a vacuum at the retentate side of the gas separation membrane and a vacuum at the permeate side of the gas separation membrane;
- feeding the gas mixture, resulting from transferring a liquid from one storage container to another container upon contact with the surroundings, to the retentate side of the gas separation membrane by the vacuum present at the retentate side and the permeate side;
- providing a flow volume per time unit of the gas mixture fed to the separating device that is greater than a flow volume per time unit of the liquid being transferred;
- generating a gas-diminished retentate on the retentate side of the gas separation membrane and generating a gas-enriched permeate on the permeate side of the gas separation membrane; and
- providing a flow volume per time unit of the permeate that is equal to the flow volume per time unit of the liquid being transferred.

The method may further comprise the step of lowering the pressure of the retentate relative to pressure of the gas mixture.

In another embodiment of the invention, the method further comprises the step of returning the permeate to the storage container.

Preferably, the method comprises the step of releasing the retentate into the surroundings.

Advantageously, the suction pressure of the gas mixture is adjusted to a predetermined value before the gas mixture enters the separating device.

The present invention also relates to a device for separating a gas mixture above a liquid characterized by:

- a separating device with a gas separation membrane having a retentate side and a permeate side, the separating device receiving a gas mixture, resulting from transferring a liquid from a storage container to another container upon contact with the surroundings;

a first pump connected to the retentate side for generating a vacuum and a second pump connected to the permeate side for generating a vacuum, wherein from the gas mixture a gas-diminished retentate is produced on the retentate side and a gas-enriched permeate is produced on the permeate side by the vacuum at the retentate side and the permeate side; and the first and the second pumps adjusted relative one another such that a flow volume per time unit of the gas mixture fed to the separating device is greater than a flow volume per time unit of the liquid being transferred and such that a flow volume per time unit of the permeate is equal to the flow volume per time unit of the liquid being transferred.

Preferably, a feed line is connected between a location of transfer of the liquid and the separating device, the feed line comprising a valve.

Advantageously, the second pump has a suction side connected to the permeate side of the separating device and a blower side connected to a liquid receptacle.

The first pump preferably has a suction side connected to the retentate side of the separating device and a blower side connected to the surroundings.

The first pump is expediently connected to a venting space of the storage container.

Advantageously, a means for adjusting the pressure of the gas mixture fed to the separating device is provided.

According to an advantageous embodiment of the invention the relation of volume of the returned gas mixture and the transferred liquid is in an area of 1 to 1.05.

In order to enable in a simple and directed manner a removal of the gas mixture directly at the location of transfer, respectively, refilling of a container with liquid, it is advantageous to lower the pressure of the permeate relative to the gas mixture to be separated whereby advantageously also the pressure of the retentate relative to the pressure of the gas mixture pressure to be separated can be reduced. Accordingly, in a directed manner, the pressure ratio for the separation of the gas mixture in the separating device comprising a gas separation membrane is used in order to generate within the area of transfer such a vacuum that the surroundings of the filling socket of a container or tank that is loaded with gases or gas mixtures is completely sucked free.

Preferably, the retentate is returned to a liquid supply from which the liquid has been removed during the transfer process, for example, an underground storage tank of a gas station etc.

The retentate that is only weakly contaminated with gas to be separated is advantageously released into the surroundings. However, it may also be expedient not to release the retentate directly into the surroundings, but instead to guide the retentate into the venting space of a liquid container so that, for example, a deficiency in the gas volume of the liquid container can be compensated with this measure.

It is furthermore advantageous to adjust the suction pressure of the gas mixture to be separated to a predetermined value before entering the separating device.

With a device for performing the method the inventive object is solved by arranging a pumping device for generating a vacuum within the separating device on the retentate side as well as on the permeate side whereby the pumping devices are adjustable such that the flow volume per time unit of the gas mixture formed during the transfer process of a liquid upon contact with the surrounding gas and to be separated and fed into the separating device is greater than the flow volume per time unit of the liquid transferred during the transfer process and that the flow volume per time unit of the produced permeate is the same or smaller than the flow volume per time unit of the liquid transfer during the transfer process.

The advantage of the inventive device is that the pumping devices on the retentate side and on the permeate side are adjustable in their operating characteristics such that within a range of their minimum load up to reaching their full load always the same separating result can be insured for the separating device with gas separation membrane, whereby in a simple manner the flow volume per time unit relation can be adjusted continuously so that the allowed ratio of gas, respectively, gas mixture to flow volume of liquid that has been transferred is not surpassed within the container, respectively, tank. Thus, in a simple manner, it is insured that a stable layering of gases, respectively, gas mixtures above the liquid level within the container, respectively, tank is not disturbed.

In general, it is possible with a suitable selection of pumping devices to maintain the flow volume per time unit relation continuously between minimal load and maximum load. Advantageously, a control valve is arranged within a feed line for the gas mixture from the location of transfer to the separating device because such a control valve is easily adjustable. With it the ratio of gas mixture to be removed from the location of transfer to the transferred amount of liquid can be adjusted, sometimes easier than by controlling the pumping devices.

The pumping device for the permeate is advantageously connected with its blower side to a liquid container into which the regained permeate is returned, while the retentate leaving the pumping device is advantageously released into the surroundings. The available pressure of the pumping devices, which are preferably vacuum pumps, at the blower side is so great that no additional pump means are required in order to provide for the aforementioned feed of the retentate as well as the permeate into the surroundings, respectively, into the liquid container.

It can also be advantageous that the pumping device for the retentate is connected to the venting space of the liquid container so that, for example, a deficiency in gas, respectively, gas mixture volume within the liquid container can be compensated by the retentate coming from the separating device.

Finally, in another advantageous embodiment of the device, the suction pressure of the gas mixture to be separated and fed to the separating device may be adjustable with a control valve.

BRIEF DESCRIPTION OF THE DRAWINGS

The invention will now be described in detail with the aid of the following only schematic drawing in context with one embodiment. The drawing shows:

In the form of a diagrammatic connection the individual elements of the device in cooperation with a fuel pump for refueling a motorized vehicle with liquid fuel and the cooperation of the device with a liquid container from which the fuel is supplied.

DESCRIPTION OF PREFERRED EMBODIMENTS

The device 10 represented in the only figure comprises substantially a separating device 13 comprising a gas separation membrane which separating device 13 performs the separation of a gas mixture 12 in a manner known per se into a retentate 14 and a permeate 15, for example by gas permeation. Since these separating methods with which such separating devices 13 operate are known in general, they will not be explained here. The inlet of the separating device 13 is connected via a feed line 19 with the supply hose 24 of a filling station for a liquid 11 whereby the liquid 11 is supplied from a liquid container 22 via a suitable connecting line to the filling station 25 with non-represented pumping means for pumping the liquid 11. The hose 24 is a so-called coaxial hose which is able to supply the gas mixture 12 to be separated as well as the liquid 11 for refilling the tank of a motorized vehicle 26; compare the only figure.

Within the feed line 19 for feeding the gas mixture 12 from the location of transfer 30 to the separating device 13, a valve in the form of control valve 21 is arranged which will be described in detail infra. Downstream of the separating device 13 pumping devices 16, 17 in the form of vacuum pumps are arranged on the retentate side 14 as well as on the permeate side 15 for generating a vacuum at the retentate, respectively, permeate side of the separating device 13. The pumping device 17 for the permeate 15 is connected with its blower side to the liquid container 22, while the retentate 14 leaving the pumping device 16 can be connected, if desired, to a venting line 27 which, in general, connects the venting space 23 of a liquid container to the surroundings, (atmosphere) respectively, the surrounding gas which is air 18.

Upon operation according to the inventive method the device 10 operates as follows:

The filling nozzle 28 provided at the free end of the supply hose 24 is inserted into the tank socket (not represented in detail) of a tank of a motorized vehicle 26. The filling nozzle 28 is provided within the direct vicinity of its outlet opening for the liquid 11 with a non-represented suction nozzles, respectively, suction openings that provide for the removal of the gas mixture 12 that is produced during the transfer of the liquid 11 upon contact with the surrounding gas 18, here surrounding air. With the aid of the two pumping devices 16 and 17 the gas mixture is guided during transfer of liquid 11, upon actuation of the transfer valve of the filling nozzle 28, through the supply hose 24 in the form of a coaxial hose and via the control valve 21 to the separating device 13. The two pumping devices 16, 17 provide such a great pressure reservoir for the inventive function of the device 10 that no additional measures for providing sufficient feed of the gas mixture 12 to the separating device 13 must be provided. In order to be able to maintain a substantially constant vacuum within the area of the transfer location 20, i.e., within the area of the transfer of the liquid 11 into the socket of the tank of a motorized vehicle 26, the control valve 21 is provided, i.e., with this control valve 21 a constant vacuum can be maintained.

With a suitably selected pumping power of the pumping devices 16, 17 in connection with the control valve 21, it is insured that the flow volume per time unit of the gas mixture, which is formed during the transfer of the liquid 11 upon contact with the surrounding gas 18 and conveyed by the vacuum produced at the permeate and retentate side, is greater than the flow volume per time unit of the liquid 11 transferred during the transfer process and that the flow volume per time unit of the generated permeate 15 is identical or smaller than the flow volume per time unit of the liquid transferred during the transfer process. The ratio of volume of gas mixture 12 to be separated at the inlet and the volume of liquid transferred from the liquid container 22 is in the range of 1 to 1.05.

The permeate 15 exiting the separating device 13 is returned from the exit side of the pumping device 17 into the liquid tank 22. The retentate exiting the separating device 13 via the pumping device 16, i.e., in the present case air with only a minimal degree of contamination with components of the liquid 11, is released into the surroundings 18, respectively, the surrounding gas, i.e., air, or is returned into the venting space 23 of the liquid container 22 in order to compensate a deficiency in gas volume within the liquid container 22.

With the aid of a model calculation the inventive method is explained for two operational stages.

| | | Flow volume (during operation) [m$^3$/h] | Pressure [mbar] | Flow volume (standard condition) [m$^3$/h] |
|---|---|---|---|---|
| 11 | gasoline | 1.67 | — | — |
| 19 | vapors/air | 2.22 | 900 | 2 |
| 190 | vapors/air | 8.62 | 116 | 2 |
| 14 | retentate | 6.1 | 66 | 0.401 |
| 140 | retentate | 0.401 | 1013 | 0.401 |
| 15 | permeate | 100 | 16 | 1.599 |
| 150 | permeate | 1.599 | 1013 | 1.599 |
| 11 | gasoline | 8.33 | — | — |
| 19 | vapors/air | 11.11 | 900 | 10 |
| 190 | vapors/air | 22.62 | 442 | 10 |
| 14 | retentate | 6.1 | 392 | 2.41 |
| 140 | retentate | 2.41 | 1013 | 2.41 |
| 15 | permeate | 100 | 76 | 7.59 |
| 150 | permeate | 7.59 | 1013 | 7.59 |

The inventive method and the inventive device 10 can also be used for separating other gas mixtures, for example, permeate gas mixtures for which at different flow volumes a uniform separation is desired.

The present invention is, of course, in no way restricted to the specific disclosure of the specification and drawings, but also encompasses any modifications within the scope of the appended claims.

We claim:

1. A method for separating a gas mixture above a liquid, said method comprising the steps of:

employing a separating device with a gas separation membrane having a retentate side and a permeate side;

producing a vacuum at the retentate side of the gas separation membrane and a vacuum at the permeate side of the gas separation membrane;

feeding the gas mixture, resulting from transferring a liquid from one storage container to another container upon contact with the surroundings, to the retentate side of the gas separation membrane by the vacuum present at the retentate side and the permeate side;

providing a flow volume per time unit of the gas mixture fed to the separating device that is greater than a flow volume per time unit of the liquid being transferred;

generating a gas-diminished retentate on the retentate side of the gas separation membrane and generating a gas-enriched permeate on the permeate side of the gas separation membrane; and providing a flow volume per time unit of the permeate that is equal to the flow volume per time unit of the liquid being transferred.

2. A method according to claim 1, further comprising the step of lowering the pressure of the retentate relative to pressure of the gas mixture.

3. A method according to claim 1, further comprising the step of returning the permeate to the storage container.

4. A method according to claim 1, further comprising the step of releasing the retentate into the surroundings.

5. A method according to claim 1, further comprising the step of adjusting the suction pressure of the gas mixture to a predetermined value before the gas mixture enters the separating device.

6. A device for separating a gas mixture above a liquid, said device comprised of:

- a separating device with a gas separation membrane having a retentate side and a permeate side, said separating device receiving a gas mixture, resulting from transferring a liquid from a storage container to another container upon contact with the surroundings;
- a first pump connected to said retentate side for generating a vacuum and a second pump connected to said permeate side for generating a vacuum, wherein from the gas mixture a gas-diminished retentate is produced on the retentate side and a gas-enriched permeate is produced on the permeate side by the vacuum at said retentate side and said permeate side; and
- a means for adjusting a pumping power of said first and said second pumps relative one another such that a flow volume per time unit of the gas mixture fed to the separating device is greater than a flow volume per time unit of the liquid being transferred and such that a flow volume per time unit of the permeate is equal to the flow volume per time unit of the liquid being transferred.

7. A device according to claim 6, further comprising a feed line connected between a location of transfer of the liquid and said separating device, said feed line comprising a valve.

8. A device according to claim 6, wherein said second pump has a suction side connected to said permeate side of said separating device and a blower side connected to a liquid receptacle.

9. A device according to claim 6, wherein said first pump has a suction side connected to said retentate side of said separating device and a blower side connected to the surroundings.

10. A device according to claim 9, wherein said first pump is connected to a venting space of the storage container.

11. A device according to claim 6, further comprising a means for adjusting the pressure of the gas mixture fed to said separating device.

* * * * *